United States Patent
Banister

[15] 3,705,962
[45] Dec. 12, 1972

[54] ELECTRICAL CORD RETRACTING MECHANISM

[72] Inventor: Lionel W. Banister, 2218 Hazard, Apt. 6, Houston, Tex. 77019

[22] Filed: June 2, 1971

[21] Appl. No.: 149,199

[52] U.S. Cl. .............................. 191/12.4, 242/107 R
[51] Int. Cl. ............................................. H02g 11/02
[58] Field of Search .............. 191/12 R, 12.2 R, 12.4; 242/107 R, 107 B, 107.6

[56] References Cited

UNITED STATES PATENTS

| | | | |
|---|---|---|---|
| 3,300,572 | 1/1967 | Dahlgren | 191/12 R |
| 1,171,745 | 2/1916 | Mundy | 191/12.2 R |
| 3,346,705 | 10/1967 | Slinkard | 191/12.4 |

*Primary Examiner*—Gerald M. Forlenza
*Assistant Examiner*—D. W. Keen
*Attorney*—William E. Ford and James L. Jackson

[57] ABSTRACT

An electrical cord retracting mechanism according to the present invention comprises an enclosure having a shaft journaled for rotation therein. A spiral spring is disposed within the enclosure with the inner extremity thereof secured to the shaft while the outer extremity of the spring is secured to the enclosure. An electrical supply cord is wound between the coils of the spring and is connected at one extremity thereof to an inlet electrical receptacle fixed to the enclosure structure while the other extremity of the supply cord terminates in a second supply receptacle. A mandrel that is disposed within the enclosure is rotatable about the shaft and receives an electrical appliance cord being wound thereabout. One extremity of the appliance cord is received within the second supply receptacle while the other extremity thereof extends through an aperture formed in the housing in order to allow ready access thereto.

12 Claims, 7 Drawing Figures

INVENTOR.
LIONEL W. BANISTER
BY Wm. E. Ford +
James E. Jackson
ATTORNEYS

ELECTRICAL CORD RETRACTING MECHANISM

BACKGROUND OF THE INVENTION

The present invention relates generally to the use of electrical appliances, particularly in the kitchen and more specifically to an electrical cord retracting mechanism that provides safe storage for electrical cords and maintains such cords in a readily accessible location.

Modern technology has developed many electrically energized appliances for use in the kitchen of homes to reduce the amount of effort necessary for the preparation of foods and for the maintenance of cleanliness. Many of the kitchen appliances are adapted to be used on the kitchen counter and are frequently stored on portions of the kitchen counter for ready access when needed. Most electrically energized kitchen appliances such as toasters, coffee makers, electric skillets, and the like have detachable cords for electrical connection thereof to electrical outlets disposed adjacent the work counters. When such cords are removed from the appliances for storage it becomes difficult to identify a particular cord for a particular appliance when several appliance cords are stored within the storage cabinet or drawer. This problem frequently necessitates removing more than one cord from the storage drawer and, after selecting the proper appliance cord, returning the remaining cords to the storage cabinet or drawer. This is of course an annoying condition that has not been effectively overcome by any presently available retractable electric cord storage systems.

Since many electrical kitchen appliances are stored on the kitchen cabinet structures when not in use, the appliance cords connecting the appliances to electrical outlets frequently litter the cabinet surfaces and present a hazardous condition especially where water is used in the vicinity of the electrical cords.

Electrical appliance cord retracting mechanisms have been developed but these structures have not been commercially acceptable, especially because of their expensive nature which results primarily because of the complicated mechanisms involved. Cord retracting mechanisms typically are provided with a separate supply conductor for connection of the mechanism to an electrical outlet. Connection between the supply conductor and the electrical appliance cord is typically established through an expensive slipdisc structure that allows rotation of a mandrel about which the cord is wound without breaking the electrical connection with the electrical supply conductor. The slip-disc structure ordinarily utilized in such electrical cord retracting mechanisms is frequently subject to wear thereby necessitating frequent repair or replacement thereof. Moreover, the expensive nature of such slip-disc structures adversely affects the competitive nature of the cord retracting mechanism.

SUMMARY OF THE INVENTION

With the view therefore toward overcoming of the aforementioned difficulties, it is a primary object of the present invention to provide a novel electrical cord retracting mechanism that provides safe storage and ready access for conventional electrical appliance cords.

It is another object of the present invention to provide a novel electrical cord retracting mechanism that is adapted to be retained on a cabinet counter top and is also adapted to be suspended from a kitchen cabinet as desired.

Among the several objects of the present invention is noted the contemplation of a novel electrical cord retracting mechanism that is provided in the form of a unit that may be connected to other similar cord retracting mechanism units in order to provide a number of readily accessible electrical appliance cords as desired by the customer.

It is an object of the present invention to provide a novel electrical cord retracting mechanism that is adapted to receive virtually any conventional electrical appliance cord.

It is an even further object of the present invention to provide a novel electrical cord retracting mechanism that utilizes simple parts that are not susceptible to wear and is therefore simple in nature, reliable in use, and low in cost.

The above and other objects and novel features of the instant invention will be readily apparent from the following description taken in conjunction with the accompanying drawings. It is to be expressly understood that the drawings are provided for the purpose of illustration and are not intended to define the limits of the invention, but rather merely illustrate preferred embodiments and structures incorporating the features of the instant invention.

BRIEF DESCRIPTION OF THE DRAWINGS

In the accompanying drawings forming a part of this specification and wherein like reference numerals are employed to designate like parts:

FIG. 7 is a fragmentary sectional view of the mandrel of FIG. 1, illustrating the plug connecting mechanism thereof in detail.

BRIEF DESCRIPTION OF THE INVENTION

The invention briefly concerns the provision of electrical cord retracting mechanisms provided with external male and female connection structures to enable the mechanisms to be connected into a multi-unit assembly and to enable electrical energy to be supplied from household electrical outlets to the assembled units through a single electrical conductor. Each of the electrical cord retracting mechanisms comprises an enclosure having a shaft journaled for rotation therein. A coil spring is disposed within the housing with the exterior extremity thereof connected to the enclosure while the inner extremity of the spring is disposed in connection with the rotatable shaft. An electrical supply cord is wound between the coils of the spring with the outer extremity thereof received in electrical connection with an inlet receptacle provided in the enclosure structure. The inner extremity of the supply cord is connected to an electrical receptacle disposed within a mandrel located within the enclosure about the rotatable shaft. The mandrel is rotatable with the shaft and spring structure. An electrical appliance cord is wound about the mandrel with one extremity thereof connected to the supply receptacle and the other extremity thereof extending through an aperture formed in the enclosure structure for ready access.

DETAILED DESCRIPTION OF PREFERRED EMBODIMENTS

Figure 1:
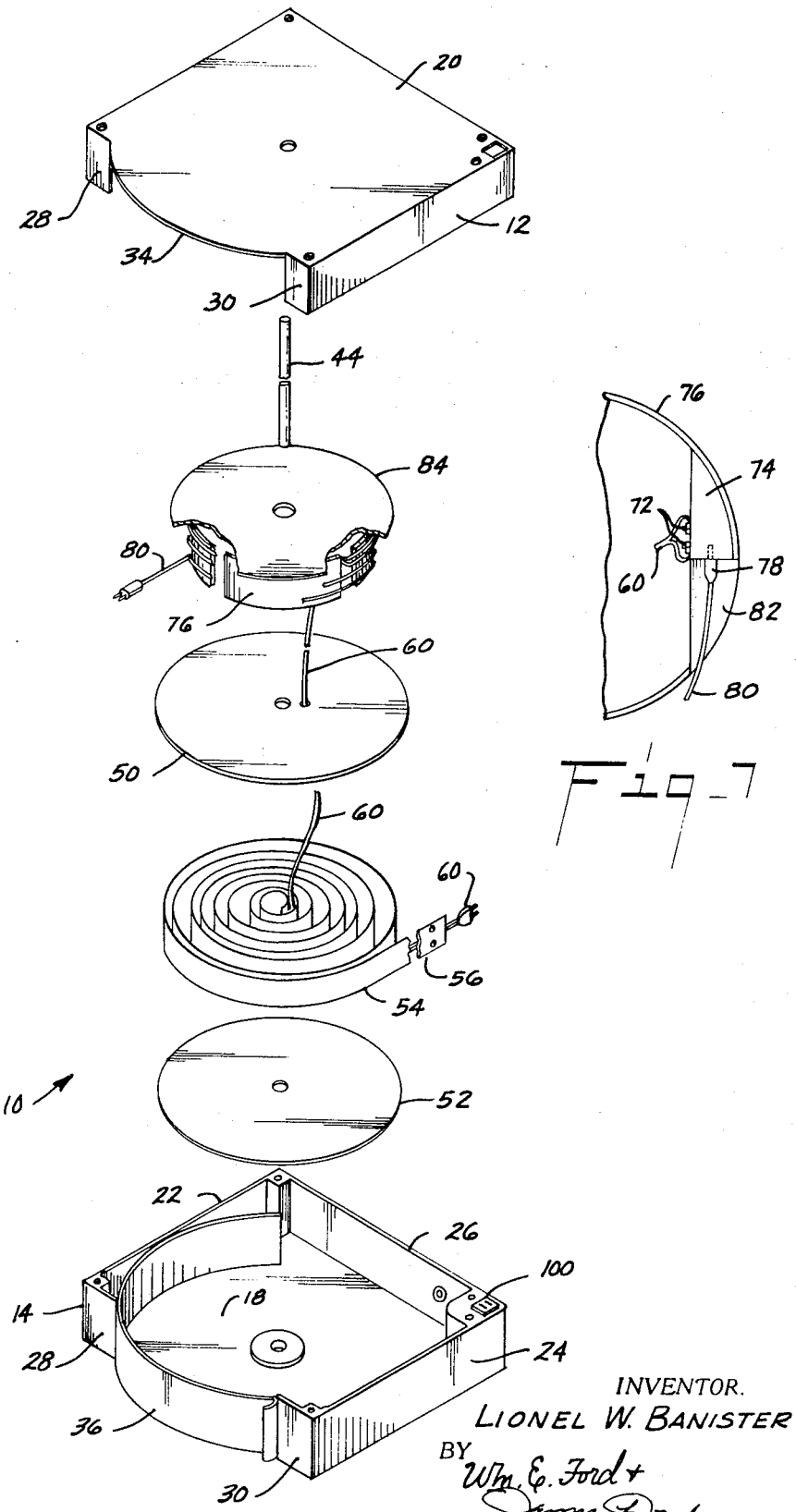
FIG. 1 is an exploded isometric view of an electrical cord retracting mechanism constructed in accordance with the present invention.
Figure 3:
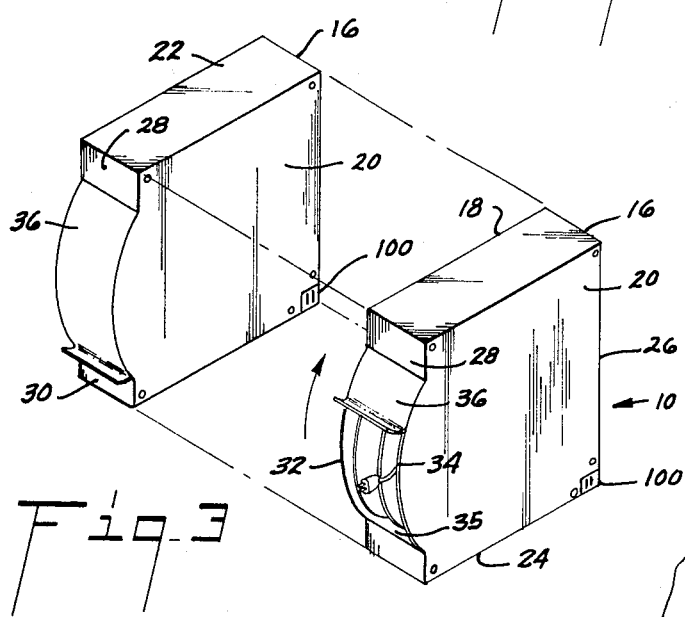
FIG. 3 is an isometric view of a pair of electrical cord retracting mechanisms and illustrating connection of the same into an assembled unit.

Referring now to the drawings for a more detailed description of the present invention, in FIG. 1 is illustrated an electrical cord retracting mechanism generally at 10 having enclosure sections 12 and 14 that interfit to define a generally rectangular enclosure 16, as illustrated best in FIG. 3, having parallel side walls 18 and 20 and generally planar top and bottom walls 22 and 24, respectively, and a rear wall 26. The front wall of the enclosure 16 is defined by upper and lower front wall segments 28 and 30, respectively, which cooperate with arcuate front surfaces 32 and 34 of the side walls 18 and 20 respectively to define an aperture 35 in the enclosure structure. An arcuate closure 36 is disposed within the enclosure structure and is movable between a lower position closing the enclosure aperture and an upper position opening the aperture and exposing the electrical appliance cord located therein.

Figure 2:
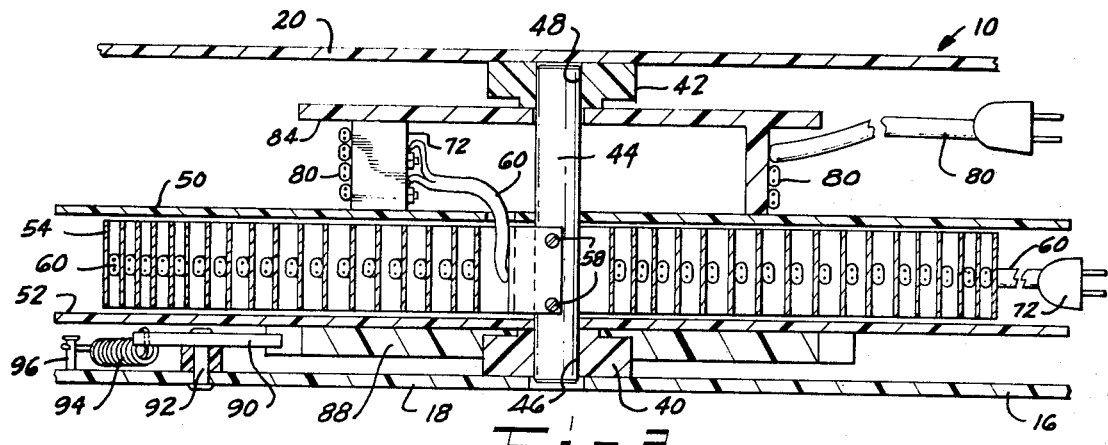
FIG. 2 is a fragmentary sectional view in elevation of the electrical cord retracting mechanism of FIG. 1.

With reference now to FIG. 2, illustrating a sectional view of the electrical cord retracting mechanism of this invention, a pair of bearing members 40 and 42 are connected respectively to side walls 18 and 20 of the enclosure. The bearings 40 and 42 may be composed of any suitable metal or plastic bearing structure and if desired may be formed integrally with the wall structures 18 and 20. A rotatable shaft 44 is disposed within the enclosure and is journaled for rotation within apertures 46 and 48 formed within the bearings 40 and 42 respectively. A pair of plate members 50 and 52 are also disposed within the enclosure and are rotatable along with the shaft 44. The plates 50 and 52 define retainer walls for a coil spring member 54 disposed therebetween. The coil spring is provided with a straight portion, as illustrated at 56 in FIG. 1, that is secured to a wall of the enclosure 16 in any desired manner. The inner extremity of the coil spring 54 is secured to the rotatable shaft 44 by means of screws 58 or the like.

An electrical supply cord 60 is wound between the coils of the spring 54 and is provided with a connector plug 62 at the outer extremity thereof that is adapted to be received within an inlet receptacle 64 fixed to the enclosure 13. A supply cord 66 is disposed in electrical connection with the receptacle 64 and is provided with a plug 68 to be received within an appropriate electrical supply outlet 70. As best illustrated in FIG. 7, the inner extremity of the electrical supply cord 60 is connected by screws 72 or the like to an electrical receptacle 74 defined in a mandrel 76 also disposed within the enclosure 16. The mandrel 76 is rotatable along with the shaft 44 and may either be a separate structural element fixed to the shaft 44 or may be formed integrally with the plate 50 if desired. As illustrated particularly in FIG. 7, the receptacle 74 is recessed within the mandrel structure in order to allow the plug portion 78 of an electrical appliance cord 80 to be received within a recess or opening 82 formed in the mandrel structure in order to prevent excessive bending of the cord 80 as the cord emerges from the recess. The mandrel 76 is provided with an annular flange 84 that provides for restraint of the appliance cord 80.

As illustrated particularly in FIG. 2, a ratchet gear 88 is connected to or formed integrally with the plate 52 as desired and is adapted to engage a pawl 90 retained by a pivot 92 in assembly with the wall 18 of the enclosure. The pawl 90 is biased by a spring member 94 secured at one extremity thereof to the enclosure by means of a post 96. The pawl and ratchet gear structure effectively allow the appliance cord to be withdrawn to the desired length where the retracting mechanism is allowed to become locked to maintain the appliance cord in the desired position. When it is desired to fully retract the appliance cord it is simply necessary to apply a force thereto sufficiently to impart a slight movement to the retracting mechanism at which time the force may be released, thereby allowing the retracting mechanism to fully withdraw.

Figure 4:
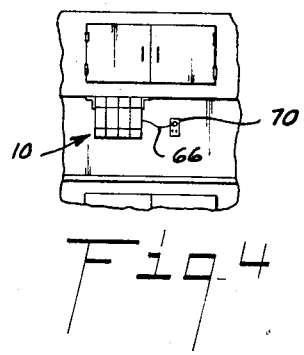
FIG. 4 is an elevational view of a portion of a kitchen cabinet structure illustrating suspension of a number of assembled electrical cord mechanisms from the cabinet structure.
Figure 5:
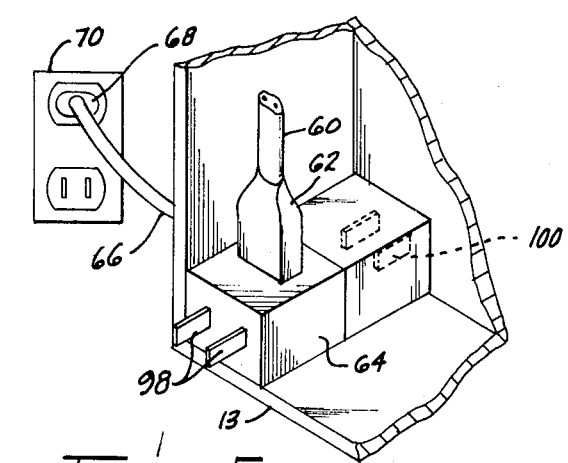
FIG. 5 is a fragmentary isometric view of the enclosure portion of an electrical cord retracting mechanism showing the electrical supply plug thereof in detail.
Figure 6:
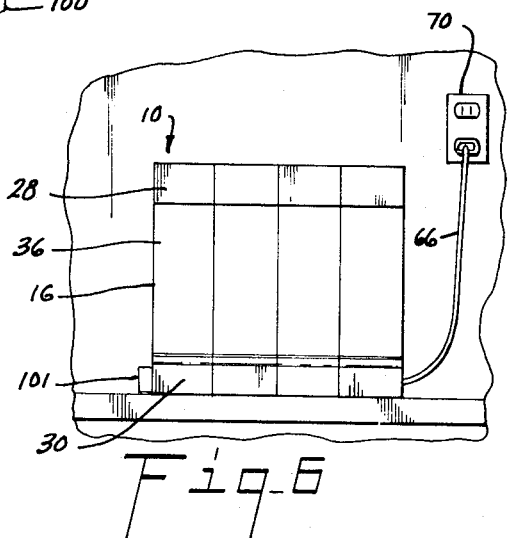
FIG. 6 is an elevational view illustrating a plurality of electrical cord retracting mechanism units assembled into a single unit for storage on a kitchen counter top and for electrical connection to an electrical outlet through a single supply conductor.

As illustrated in FIGS. 3, 4, and 6, the enclosure 16 may be assembled in order to provide a plurality of electrical appliance cords in a single assembly connected by a single electrical supply conduit to an electrical wall receptacle. As illustrated in FIG. 5, the electrical supply receptacle 64 is provided with male electrical connectors 98 that extend outwardly of side wall 18 of the enclosure. As illustrated in FIG. 3 each of the enclosures is provided with a female electrical receptacle that may be formed integral with or fixed to the side wall 20 in any desired manner. The male and female electrical connecting structures 98 and 100 establish electrical connection as the enclosures 16 are brought into intimate assembly. When this has been accomplished, electrical connection is made to a plurality of assembled enclosures through a single electrical supply conduit 66 as indicated particularly in FIGS. 4 and 6. If desired, the electrical supply cord 66 may be received by the male connectors 98 of one of the assembled cord retracting units. In the alternative, the unused male connectors may be received by a protective cover 101 of electrically non-conductive material such as plastic.

OPERATION

When it is desired to retract the electrical appliance cord 80 with the enclosure 16 resting upon a counter top, as illustrated in FIG. 6, or suspended from a cabinet structure, as illustrated in FIG. 4, it is simply necessary to raise the movable closure 36 thereby gaining access to the aperture 35 of the enclosure. The electrical appliance cord 80 is then grasped and force is applied thereto to pull the same through the aperture 35. When the cord 80 is pulled the mandrel 76 is rotated, thereby causing rotation of the shaft 44, the plates 50 and 52, and the inner extremity of the coil spring 54. When this occurs, the spring 54, being secured to the enclosure at the outer extremity thereof is subjected to tortional forces and causing the spring to store energy. If desired, the spring may be subjected to a predetermined amount of preload energy to insure return of the same to its original condition. When the appliance cord 80 has been retracted to the desired length, pressure is relaxed slightly thereon allowing the pawl 90 to be forced by spring 94 into positive engagement with the teeth of the ratchet gear 88 thereby locking the mechanism against further rotation. The cord retracting mechanism will remain in this position until further movement is induced thereto by pulling on the appliance cord 80 a slight amount thereby allowing the pawl to release its locking engagement with the ratchet gear. When this has occurred the stored energy of spring 54 will rotate the spring back to its initial position thereby causing the mandrel 76 to rotate to a position completely retracting the appliance cord 80 within the aperture 35. After this has been accomplished, the closure 36 may be lowered thereby providing complete protection for the electrical appliance cord disposed therein.

When it is desired to assemble two or more of the enclosures 16 into assembly, it is simply necessary to bring the male and female receptacles thereof into engagement in order to establish electrical interconnection. The number of enclosures that may be so assembled is limited only by electrical safety limitations.

In view of the foregoing, it is apparent that I have provided a novel electrical cord retracting mechanism that solves the storage problem typically encountered during use of detachable appliance cords. It is simply necessary in this case to select the desired cord from those presented to the user and to grasp the cord and extend it to the desired length. The kitchen cabinet structure on or adjacent which the electrical cord retracting mechanisms of this invention are disposed will obviously remain free from litter by used or unused electrical cords thereby providing a safer and more convenient place for kitchen working operations. My invention is adapted to be used singly or connected in a plurality of units as desired by the customer. My invention has been accomplished while utilizing simple parts that are not susceptible to a high degree of wear, as compared with conventional cord retracting mechanisms, and therefore is simple in nature, reliable in use, and low in cost. It is readily understood therefore that my invention is well adapted to attain all of the objects and advantages hereinabove set forth together with other objects and advantages that are inherent in the apparatus itself. While certain representative embodiments and details thereof have been shown for the purpose of illustrating this invention, it will be apparent to those skilled in the art that various changes and modifications may be made therein without departing from the spirit or scope of my invention.

I claim:

1. An electrical cord retracting mechanism comprising; an enclosure, a shaft journaled for rotation within said enclosure, spiral spring means disposed within said enclosure and having the inner extremity thereof secured to said shaft and the outer extremity thereof being secured to said enclosure, a inlet receptacle fixed to said enclosure, an electrical supply cord being wound between the folds of said spring and having one extremity thereof received within said inlet receptacle and the other extremity terminating in a supply receptacle, a mandrel disposed within said enclosure about said shaft, an electrical appliance cord being wound about said mandrel, an aperture formed in said enclosure, one extremity of said appliance cord being received within said second supply receptacle and the other extremity thereof extending through said aperture, means locking said mechanism in any desired position thereof.

2. An electrical cord retracting mechanism as recited in claim 1; said coil spring retainer means comprising a shaft journaled for rotation within said enclosure, the inner extremity of said spring being fixed to said shaft, spring guide means being rotatable with said shaft.

3. An electrical cord retracting mechanism as recited in claim 2; said mandrel being rotatable with said spring guide means and being of smaller diameter than the diameter of said spring.

4. An electrical cord retracting mechanism as recited in claim 2; said coil spring retainer means comprising a shaft journaled for rotation within said enclosure, the inner extremity of said coil spring being fixed to said shaft, a pair of retainer plates being disposed on either side of said spring and being rotatable with said shaft, said mandrel being supported by one of said plates.

5. An electrical cord retracting mechanism as recited in claim 2; said supply receptacle being carried by said mandrel and being oriented to prevent excessive bending of said appliance cord.

6. An electrical cord retracting mechanism as recited in claim 1; said enclosure having external electrical connecting means whereby two or more mechanisms may be disposed in operable assembly.

7. An electrical cord retracting mechanism comprising; an enclosure, spring retainer means rotatably disposed within enclosure, a coil spring being disposed within said spring retainer and having one extremity thereof connected to said enclosure and the other extremity being secured to said spring retainer means, an electrical inlet receptacle carried by said enclosure, an electrical supply cord being wound between the coils of said coil spring, the inner extremity of said supply cord having a supply receptacle, the outer extremity of said cord being connected to said inlet receptacle, a mandrel disposed within said enclosure and being rotatable along with said spring retainer means, said enclosure defining an access aperture, an electrical appliance cord being received in electrical connection with said supply receptacle and being wound about said mandrel, said appliance cord having the free extremity thereof extending through said aperture.

8. An electrical cord retracting mechanism as recited in claim 7; said inlet receptacle having male and female electrical connectors oriented to enable two or more cord retracting mechanisms to be disposed in abutted assembly with electrical circuits thereof interconnected.

9. An electrical cord retracting mechanism as recited in claim 8; said supply receptacle being carried by said mandrel, said appliance cord being received in electrical connection with said supply receptacle.

10. An electrical cord retracting mechanism as recited in claim 8; said supply receptacle being formed integrally with said mandrel and defining a peripheral recess, said electrical appliance cord having an electrical terminal connector received within said recess in electrical connection with said supply receptacle preventing excessive bending of said appliance cord.

11. An electrical cord retracting mechanism as recited in claim 7; said mandrel being of substantially smaller diameter than the diameter of said coil spring in the uncompressed condition thereof thereby allowing said spring to have sufficient force to return said appliance cord to the retracted position thereof.

12. An electrical cord retracting mechanism as recited in claim 7; a ratchet gear being carried in fixed relation with said spring retainer means, a pawl movably connected to said enclosure and engaging said ratchet gear to lock said retracting mechanism in any desired position thereof.

* * * * *